United States Patent

Okuyama et al.

[11] Patent Number: 6,129,981
[45] Date of Patent: Oct. 10, 2000

[54] MAGNETIC RECORDING MEDIUM AND MAGNETIC RECORDING DISK DEVICE

[75] Inventors: Chiaki Okuyama; Kenji Sato; Yuki Yoshida; Iwao Okamoto, all of Kawasaki, Japan

[73] Assignee: Fujitsu Limited, Kawasaki, Japan

[21] Appl. No.: 09/187,082

[22] Filed: Nov. 6, 1998

[30] Foreign Application Priority Data

Feb. 20, 1998 [JP] Japan .................................. 10-039259

[51] Int. Cl.$^7$ ....................................................... G11B 5/66
[52] U.S. Cl. .......................... 428/332; 428/336; 428/692; 428/694 TS; 428/694 TC; 428/694 TM; 428/900; 360/113; 324/252
[58] Field of Search ........................... 428/694 TM, 900, 428/692, 332, 336, 634 TS, 694 TC; 324/252; 360/113

[56] References Cited

U.S. PATENT DOCUMENTS

| | | | |
|---|---|---|---|
| 4,814,238 | 3/1989 | Inoue | 428/694 TM |
| 5,552,217 | 9/1996 | Yamaguchi | 428/332 |
| 5,763,071 | 6/1998 | Chen | 428/332 |
| 5,851,656 | 12/1998 | Ohkubo | 428/332 |
| 5,952,097 | 9/1999 | Zhang | 428/332 |

FOREIGN PATENT DOCUMENTS

| | | |
|---|---|---|
| 60228637 | 11/1985 | Japan . |
| 63148411 | 6/1988 | Japan . |
| 750008 | 2/1995 | Japan . |
| 750009 | 2/1995 | Japan . |

*Primary Examiner*—Leszek Kiliman
*Attorney, Agent, or Firm*—Greer, Burns & Crain, Ltd.

[57] ABSTRACT

A magnetic recording medium and a magnetic disk device using the same. The magnetic recording medium comprising a nonmagnetic substrate having applied thereon, through a chromium-based underlayer, at least one magnetic recording layer consisting of cobalt as a principal component, 14 to 23 at % of chromium, 1 to 20 at % of platinum as well as tungsten and carbon. The magnetic recording medium exhibits reduced noise, an improved resolution of the reproducing waveforms and an increased S/N ratio.

26 Claims, 10 Drawing Sheets

MAGNETIC RECORDING MEDIUM AND MAGNETIC RECORDING DISK DEVICE

BACKGROUND OF THE INVENTION

1. Field of the Invention

The present invention relates to a magnetic recording medium and more particularly to a magnetic recording medium which enables high-density recording by virtue of a high coercive force and, particularly, exhibits reduced noise, an improved resolution of the reproducing waveforms and an increased S/N ratio. The present invention also relates to a magnetic recording disk device, in brief, a magnetic disk device, for recording and reproducing information, the disk device using the magnetic recording medium of the present invention and being provided with a magnetoresistive head.

2. Description of Related Art

The development of information processing techniques has led to an increasing demand for an increase in the density of magnetic disk devices used in external storage devices for computers. Specifically, in the reproducing head of the magnetic disk devices, the use of a magnetoresistive head utilizing a magnetoresistor, wherein the electric resistance changes in response to the magnetic field intensity, that is, an MR head, instead of the conventional wound-type inductive thin film magnetic head has been proposed in the art. The MR head applies magnetoresistance, that is, the change in electric resistance produced in a magnetic material on application of an external magnetic field, to the reproduction of a signal on a recording medium and has features including a reproduction output margin that is several times larger than that of the conventional inductive thin film magnetic head, a low inductance and a large S/N ratio. Further, the use of an AMR (anisotropic magnetoresistive) head utilizing anisotropic magnetoresistance, a GMR (giant magnetoresistive) head utilizing giant magnetoresistance, and a spin valve GMR head of a practical type, besides the MR head, have also been proposed.

Further, in order to meet the demand for high-density recording, a sufficient improvement in properties, to cope with the above MR head, AMR head, or GMR head (including spin valve head) has been demanded of the magnetic recording medium. In particular, low noise and a high coercive force Hc are required in the magnetic recording medium.

Hitherto, as is well-known in the art, the magnetic recording medium has been generally produced by depositing chrominium on a nonmagnetic substrate such as an aluminum substrate to form an underlayer, followed by depositing a cobalt-based alloy on the resulting chromium underlayer to form a magnetic recording layer.

Further, to obtain a reduced noise level, many changes, such as the addition of an additional element to the alloy of the magnetic recording layer, thereby breaking the magnetic interaction between the magnetic particles or reduction in the particle size of the magnetic particles, have been made to the magnetic recording medium. For example, Japanese Unexamined Patent Publication (Kokai) No. 63-148411 discloses a low noise-and high density recording-type magnetic recording medium which is suitable for use in high density recording devices. The magnetic recording medium disclosed in this publication is characterized in that the Co/Ni-based alloy or Co/Cr-based alloy constituting the magnetic recording layer contains a third element added thereto, that is, any one of Ta, Mo and W or an alloy thereof. Japanese Unexamined Patent Publication (Kokai) No. 7-50008 discloses a magnetic recording medium which can simultaneously satisfy both the requirements of a high coercive force and low noise. Specifically, the magnetic recording medium disclosed in this publication comprises a nonmagnetic substrate layer and a magnetic layer deposited through a nonmagnetic metal underlayer (thickness=10–300 nm) of chromium or a chromium alloy on the nonmagnetic substrate layer, the magnetic layer being formed of an alloy containing Co, Cr, Pt, and at least one member selected from the group consisting of Nb, Hf, W, Ti, and Ta. According to this invention, not only a high coercive force of 1,610 to 1,750 Oe (Examples 1 to 7) but also low noise can be achieved. Similarly, Japanese Unexamined Patent Publication (Kokai) No. 7-50009 discloses a magnetic recording medium wherein a thin film medium of an alloy of 95 to 60 at % of Cr and 5 to 40 at % of at least one member selected from Mo and W is used as an underlayer for a magnetic layer, having a single layer structure, of a CoCrPt alloy. This magnetic recording medium also can realize, simultaneously, a high coercive force and low noise. More specifically, the use of a Cr layer containing 28 at % of Mo as the underlayer results in an about 10% reduction in noise as compared with the underlayer consisting of Cr alone. In the techniques disclosed in these publications, however, tBr (a product of the thickness t and the residual magnetic flux density Br of the magnetic recording layer) is not less than 270 G.$\mu$m, rendering these techniques unsatisfactory for the higher density recording expected in the future.

In addition, to attain a highly increased density in the magnetic recording devices, it is necessary to provide a magnetic recording medium having a high resolution of signal in which a reproducing output is not easily reduced at the high recording density, and thus the development of such medium has been zealously sought in the field of magnetic recording. For example, in the reference material 91-8-3(2) published on 1991 by Jikikougaku Kenkyukai (magnetic engineering research association), a magnetic recording medium capable of both high resolution and low noise has been reported. According to this report, a high output and low noise magnetic recording medium can be produced by first depositing a low noise material, $Co_{74.2}Cr_{14.5}Pt_{8.4}Si_{2.9}$, on a Cr underlayer to form a lower magnetic layer, followed by directly depositing a high output material, $Co_{74.2}Cr_{4.7}Pt_{21.1}$, on the lower magnetic layer to form an upper magnetic layer. However, for this duplicated magnetic layer of $Co_{74.2}Cr_{4.7}Pt_{21.1}/Co_{74.2}Cr_{14.5}Pt_{8.4}Si_{2.9}$, it is difficult to obtain a remarkably improved S/N ratio due to the use of CoCrPt alloy with a low Cr content, as an upper magnetic layer.

In this connection, the inventors have measured the read/write performances for the above-discussed magnetic recording media and other conventional magnetic recording media, and found that sufficiently high read/write performances cannot be attained when the recording density is the level required at present, that is, generally 1 Gb/in$^2$ or more. In other words, for these magnetic recording media, it becomes possible to obtain low noise but it is difficult to avoid drawbacks which are caused simultaneously, such as a reduction of reproducing output. It is therefore desirable to ensure a remarkable reduction of noise in the media, while maintaining a high reproducing output.

For reference, Japanese Unexamined Patent Publication (Kokai) No. 60-228637 discloses a CoCr alloy which is useful as a target material in the production of a magnetic recording medium using a sputtering method. Using this target material, cracks can be effectively prevented in the resulting magnetic layer and, also, the magnetic layer can be processed with a high efficiency. The CoCr alloy is characterized by containing 9.0 to 22.5% by weight of Cr, 0.001 to 5% by weight of one element or two or more elements selected from the group consisting of Sc, V, Nb, Ta, W, Mn, Tc, Re, Fe, Os, Ir, Ni, Pd, Pt, Cu, Ag, Au, Zn, Cd, B. Al, Ca, In, Tl, C, Si, Ge, Sn, Pb, P, As, Sb, Bi, S, Se and Te, and a balance of Co. However, this publication teaches only that the described sputtering target can inhibit the generation of cracks in the magnetic layer as a function of the addition of a minor amount of additional element(s) to the CoCr alloy, and is silent concerning provision of a magnetic recording medium having a reduced noise, improved resolution of the reproducing waveforms and increased S/N ratio. It should be also noted that the appended working examples of this publication include only the preparation examples of five alloy targets, i.e., CoCrCu alloy, CoCrMnV alloy, CoCrGeSn alloy, CoCrCaSi alloy and CoCrCuC alloy.

SUMMARY OF THE INVENTION

The objects of the present invention are directed to solving the many problems which were described above with reference to the prior art magnetic recording media.

A first object of the present invention is therefore to provide a magnetic recording medium, particularly a longitudinal magnetic recording medium, which exhibits a high coercive force, thereby ensuring a high reproducing output, and reduced noise, and also which can improve a resolution of the reproducing output and the S/N ratio.

A second object of the present invention is to provide a magnetic recording disk device using the specific magnetic recording medium according to the present invention.

The above-described and other objects of the present invention will be easily understood from the following detailed description of the present invention.

In one aspect thereof, the present invention provides a magnetic recording medium comprising a nonmagnetic substrate having applied thereon, through an underlayer of a chromium (Cr)-based nonmagnetic metal material, at least one magnetic recording layer of a magnetic metal material, in which said magnetic recording layer has a single layer structure, and is constituted from a five-component metal alloy which contains as a principal component thereof cobalt (Co), and also contains 14 to 23 at % of chromium (Cr) and 1 to 20 at % of platinum (Pt) in combination with tungsten (W) and carbon (C).

That is, the inventors have zealously studied the above-described prior art problems, and found that excellent results can be obtained with regard to the magnetic properties and the noise properties, if the magnetic recording layer is constituted from a five-component metal alloy which is prepared by adding Pt, W and C to the CoCr alloy, which is conventional in the prior art magnetic recording layer, with control of each element to within the above-described range of composition. Especially, it should be noted that, in the magnetic recording medium of the present invention, remarkable noise characteristics can be obtained in the areas which are not referred to in the prior art publications, i.e., tBr <200 G.μm, Hc >2,000 Oe and a recording density of not less than 1 Gb/in².

In another aspect thereof, the present invention provides a magnetic recording medium comprising a nonmagnetic substrate having applied thereon, through an underlayer of a chromium (Cr)-based nonmagnetic metal material, at least one magnetic recording layer of a magnetic metal material, in which said magnetic recording layer has a two layer structure consisting of an upper recording layer and a lower recording layer, wherein said upper recording layer is constituted from a five-component metal alloy which contains as a principal component thereof cobalt (Co) and also contains 14 to 23 at % of chromium (Cr) and 1 to 20 at % of platinum (Pt) in combination with tungsten (W) and carbon (C), and said lower recording layer, between said upper recording layer and said underlayer, is constituted from a five-component metal alloy which contains as a principal component thereof cobalt (Co) and also contains 13 to 21 at % of chromium (Cr) and 1 to 20 at % of platinum (Pt) in combination with tantalum (Ta) and niobium (Nb).

That is, the inventors have found that in the above-described magnetic recording medium of the present invention, if the single layer structure of the magnetic recording layer is changed to a duplicated or two layer structure wherein an upper recording layer is constituted from the same or similar alloy as that of the single layer structure, that is, an alloy capable of exhibiting a lower noise, in comparison with the CoCrPt-based alloy, while maintaining a good separation capability; i.e., five-component alloy obtained by addition of Pt, W and C to the CoCr alloy, and, at the same time, a lower recording layer is constituted from the alloy capable of exhibiting remarkably low noise in comparison with the prior art medium, i.e, five-component alloy obtained by addition of Pt, Ta and Nb to the CoCr alloy, it becomes possible to produce a low noise magnetic recording medium with a high resolution of reproducing output.

In the magnetic recording medium of the present invention, as will be described hereinafter in detail, the resulting magnetic characteristics can be widely varied and controlled, to obtain the desired results, by modifying the composition, production method and production conditions of the magnetic recording layer.

According to another aspect of the present invention, there is provided a magnetic recording disk device comprising a recording head section for recording information in a magnetic recording medium and a reproducing head section for reproducing information, wherein the magnetic recording medium is the magnetic recording medium of the present invention described above and described below in detail and the reproducing head section is provided with a magnetoresistive head. The magnetoresistive head used herein is preferably a MR head, AMR head or GMR head, each of which can show a good performance.

As will be appreciated from the following detailed description of the present invention, according to the present invention, the magnetic recording medium having a higher resolution of reproducing output and lower noise in comparison with the prior art magnetic recording media can be provided. Thus, the present invention ensures a higher S/N ratio at the high density recording, thereby providing a magnetic recording disk device for high density recording which is better than the prior art disk devices.

DESCRIPTION OF THE PREFERRED EMBODIMENTS

The magnetic recording medium according to the present invention comprises a nonmagnetic substrate and at least one magnetic recording layer consisting of a magnetic metal material applied through an underlayer consisting of a chromium-based nonmagnetic metal material over the nonmagnetic substrate. The magnetic recording layer may have different layer structures and, preferably, it may be a single layer structure or a duplicated or double layer structure consisting of upper and lower recording layers.

In the magnetic recording medium of the present invention, the nonmagnetic substrate used as a base body of the medium may be formed from a wide variety of substrate materials which are conventional in the field of magnetic recording. Typical examples of suitable substrate materials include, but are not restricted to, NiP-plated aluminum or aluminum alloy disks, glass or tempered glass disks, silicon disks with a surface oxide layer such as silicon oxide layer, SiC disks, carbon disks, plastic disks and ceramic disks. Particularly, NiP-plated aluminum or aluminum alloy disks can be advantageously used in the practice of the present invention.

The underlayer applied on the nonmagnetic substrate, as mentioned above, is formed from a chromium-based nonmagnetic metal material. Particularly, the underlayer can be advantageously formed from a sole material containing only chromium as a principal component or from an alloy material containing both chromium and molybdenum as a principal component. For the magnetic recording medium of the present invention, since the magnetic recording layer contains platinum as one layer component, it is preferred that the underlayer is formed from the CrMo alloy. This is because the addition of Mo widens the lattice spacing of the underlayer so that the widened lattice spacing can approach the lattice spacing of the overlying magnetic recording layer (CoCr-based alloy) which is widened depending upon the composition of the magnetic layer, particularly the Pt content, thereby accelerating a preferential longitudinal orientation for the C-axis of the magnetic layer.

As described above, the Cr or CrMo underlayer is advantageously used in the practice of the present invention. Moreover, if desired, any other underlayer materials may be used and typical examples thereof include CrW, CrV and CrTi.

The underlayer is preferably formed in accordance with a sputtering method such as magnetron sputtering under conventional sputtering conditions. Especially, to obtain a highly increased coercive force, it is preferred to carry out the sputtering process under the application of a negative DC bias. Suitable sputtering conditions include, for example, a temperature of about 100 to 300° C., argon (Ar) gas pressure of about 1 to 10 mTorr and negative DC bias of about 100 to 300V. If desired, in place of the sputtering method, other layer-forming methods such as vapor deposition and ion beam sputtering may be used. The layer thickness of the underlayer may be widely varied depending upon various factors, and preferably it is in the range of 5 to 60 nm in view of increase of a S/N ratio. A layer thickness below 5 nm will produce only insufficient magnetic characteristics, and a layer thickness above 60 nm will show a tendency to increase the noise.

In the magnetic recording medium of the present invention, the magnetic recording layer to be formed on the nonmagnetic underlayer, if it should be constituted as a single layer, is constituted from a five-component metal alloy which contains cobalt as a principal component thereof, and also contains 14 to 23 at % of chromium and 1 to 20 at % of platinum, and, in addition, contains, in combination, tungsten and carbon. Note, as is described above, that this magnetic recording layer may form an upper layer when the magnetic recording layer should be formed as a duplicated or two layer structure in accordance with another embodiment of the present invention.

More particularly, the five-component alloy constituting the single magnetic layer or the upper layer of the duplicated magnetic layer is preferably constituted so that it satisfies the following range of composition:

in which
bal. means a balance amount, and
a sum of x and y (x+y) is in the range of 1 to 7 at %.

In this magnetic recording medium of the present invention, since the magnetic layer is constituted from a CoCrPt alloy, both of W and C are additionally contained in the alloy and also the layer structure of the medium and the layer-forming process used are optimized, a remarkable reduction of the noise can be accomplished and therefore a highly increased S/N ratio ensuring a high density recording can be obtained.

According to analysis by the inventors, the reason why the above-described notable effects can be obtained is considered to reside in the fact that the additional elements W and C added to the CoCrPt alloy in the formation of the magnetic layer can produce stable compounds, i.e., WC and $W_2C$, at an interface between the particles of the magnetic crystal due to the very small solid solubility of the compounds in the cobalt.

WC and $W_2C$ compounds produced in the magnetic layer, since they are not a ferromagnetic material, can interrupt the magnetic bonding between magnetic particles, thereby reducing noise, when they are produced at an interface between the magnetic particles. However, addition of an excess amount of carbon (C) will cause the formation of finely divided magnetic particles in the magnetic layer, thereby lowering the resulting coercive force. Thus, in the CoCrPtWC alloy, a ratio of carbon in W:C must be less than 2. Further, as is apparent from the above, 1.5 parts (average) of tungsten (W) can be bonded to 1.0 part of carbon. The remaining W can migrate into a Co-rich area of the magnetic particles, thereby causing the formation of finely divided particles which can contribute on a reduction in medium noise. Furthermore, when a ratio of tungsten in W:C is more than 5, the alloy structure is further refired and thus the coercive force Hc is lowered. As a result, the medium noise is increased and the signal output in the high density recording area is lowered. Moreover, addition of an excess amount of tungsten will cause hardening of the target material, thereby making fabrication of the target material difficult. From the above-described view points, in the CoCrPtWC alloy consisting of a single magnetic layer or the upper layer of the duplicated magnetic layer, the ratio, in the addition amount, of tungsten and carbon is preferably in the range of 5:1 to 2:1. More preferably, the ratio, in the addition amount, of tungsten and carbon is 4:1 and a sum of x and y in the above formula is in the range of 1 to 7 at %.

In another aspect of the present invention, the magnetic recording layer may have a duplicated structure, and in such a case, an upper magnetic layer may be formed from the above-described five-component alloy, i.e., CoCrPtWC alloy, and a lower magnetic layer between the upper magnetic layer and the underlayer may be constituted from a five-component metal alloy which contains cobalt as a principal component thereof and also contains 13 to 21 at % of chromium and 1 to 20 at % of platinum, and, in addition, contains, in combination, tantalum and niobium.

More particularly, the CoCrPtTaNb alloy constituting a lower layer of the duplicated magnetic layer is preferably constituted so that it satisfies the following range of composition:

in which
bal. means a balance amount, and
a sum of x and y (x+y) is in the range of 1 to 7 at %.

In this lower magnetic layer, it is preferred that the addition amounts of tantalum and of niobium are the exactly or substantially same, and a sum of x and y in the above formula is in the range of 1 to 7 at %. Showing one example, the lower magnetic layer is constituted from $Co_{74}Cr_{17}Pt_5Ta_2Nb_2$ and it is produced in a magentron sputtering apparatus under the conditions: temperature of not less than 200° C. and bias voltage of −80 to −400V, the resulting magnetic characteristics each is an optimum value, i.e., tBr=100 G.μm, Hc=2,500 Oe, S=0.8 and S*=0.8.

Especially, the inventors have found that, if the magnetic recording layer is divided into two layers in view of the desired functions and effects and, in such divided magnetic layer a lower layer is formed from $Co_{74}Cr_{17}Pt_5Ta_2Nb_2$ showing a remarkable reduction of noise and an upper layer is formed from the above $Co_{bal.}$-$Cr_{14-23}$-$Pt_{1-20}$-$W_x$-$C_y$ showing an excellent resolution and diminished noise, a magnetic recording medium satisfying the requirements for high resolution and low noise can be produced.

In the magnetic recording medium of the present invention, the magnetic recording layer, regardless of its layer structure, i.e., single layer structure or duplicated layer structure, preferably has a tBr value (product of a layer thickness t of the magnetic recording layer and its residual magnetic flux density Br) of 30 to 180 G.μm. More preferably, the magnetic recording layer having a single layer structure has a tBr value in the range of 50 to 180 G.μm, and the magnetic recording layer having a duplicated layer structure has a tBr value in the range of 30 to 160 G.μm. The magnetic recording layer is particularly suitable for use in the magnetic recording medium designed to be used in combination with a MR head and other magnetoresistive heads, since it is characterized by having a lower Br value in comparison with the prior art magnetic recording layers.

The magnetic recording layer formed through the underlayer on the nonmagnetic substrate is formed as a single layer of the CoCrPtWC alloy or, alternatively, is formed as a duplicated layer consisting of the CoCrPtWC alloy as an upper layer and the CoCrPtTaNb alloy as a lower layer. Each magnetic recording layer is preferably formed in accordance with a sputtering method under certain production conditions. Especially, to obtain a highly increased coercive force, it is preferred to carry out the sputtering process under the application of a negative DC bias. As in the above-described production of the underlayer, the sputtering process may be advantageously carried out by using a magnetron sputtering method and others. Suitable sputtering conditions include, for example, a temperature of about 100 to 350° C., preferably about 200 to 320° C. and more preferably about 250° C., argon (Ar) gas pressure of about 1 to 10 mTorr and negative DC bias of about 80 to 400V. Note herein that a temperature above about 350° C. should be avoided, because such a high temperature may produce a magnetic characteristic in the substrate, which has to be nonmagnetic, during the sputtering process. In addition, if desired, in place of the sputtering method, other layer-forming methods such as vapor deposition and ion beam sputtering may be used. One suitable example for the production of the magnetic recording layer includes the steps of providing a NiP-plated aluminum disk as the nonmagnetic substrate and depositing the magnetic recording layer from the corresponding target alloy at a temperature of about 220 to 320° C. with the application of a negative DC bias in accordance with the sputtering method.

If necessary and preferable, the magnetic recording medium of the present invention may further comprise, as the outermost layer and usually on the magnetic recording layer, a protective layer frequently adopted in the art. Suitable protective layers include, for example, a layer consisting of carbon alone and layers of carbon compounds, for example, C layer, WC layer, SiC layer, $B_4C$ layer, and hydrogen-containing carbon (C) layer. In particular, a protective layer of carbon or diamondlike carbon (DLC) can be advantageously used in the practice of the present invention. The DLC layer can exhibit a high hardness. The above protective layer may be deposited by the conventional method, for example, by sputtering or chemical vapor deposition. The layer thickness of the protective layer may vary widely depending upon various factors. It, however, is preferably about 5 to 15 nm.

Further, in the magnetic recording medium of the present invention, an additional underlayer composed mainly of titanium, preferably a thin film of Ti, may be optionally provided between the nonmagnetic substrate and the overlying underlayer.

In the magnetic recording medium of the present invention, in addition to the above-mentioned indispensable layers and optional layers, additional layers commonly used in the art may be included. Otherwise, the layers constituting the magnetic recording medium may be optionally subjected to chemical treatment or the like. For example, the protective layer may have thereon a lubricant layer comprising a fluorocarbon resin or otherwise may be subjected to treatment for imparting the same effect attained by the lubricant layer.

According to a further aspect of the present invention, there is provided a magnetic recording disk device, using the magnetic recording medium of the present invention described above and described below in detail. The structure of the magnetic disk device of the present invention is not particularly limited. Basically, however, the device comprises: a recording head section for recording information in a magnetic recording medium; and a reproducing head section for reproducing information. In particular, as will be described below, the reproducing head section is preferably provided with a magnetoresistive (MR) head using a magnetoresistor wherein the electric resistance changes in response to the magnetic field intensity.

Preferably, the magnetic disk device of the present invention has a magnetoresistor and a conductor layer for supplying a sense current into the magnetoresistor, and a composite magnetic head comprising a lamination of a magnetoresistive reproducing head, for reading information from the magnetic recording medium, and an induction type recording head, for recording information on the magnetic recording medium, having a pair of thin film electrodes, may be used. Magnetoresistive reproducing heads usable herein may have various structures known in the art and include AMR (anisotropic magnetoresistive) heads utilizing anisotropic magnetoresistance and GMR (giant magnetoresistive) heads utilizing giant magnetoresistance (including spin valve GMR head and the like). The conductor layer of the reproducing head may have various constructions. However, preferred conductor layers include:

1. a conductor layer having such a thickness that the thickness of the conductor layer in its portion in the vicinity of the magnetoresistor is relatively small with the thickness in the other portion being large; and
2. a conductor layer wherein the thickness and the width of the conductor layer in its portion in the vicinity of the magnetoresistor are relatively small with the thickness and the width in the other portions being large. The thickness and optionally the width of the conductor layer to satisfy the above construction requirements may be regulated by various methods. A particularly recommendable method for such regulation is to increase the thickness by forming the conductor layer so as to have a multi-layer structure.

As compared with the conventional composite magnetic head, the magnetic disk device particularly having the above construction can reduce the curving of the magnetic pole of the recording head section and, at the same time, can reduce the resistance of the conductor layer and, when the off-track error is small, can read information with high accuracy and sensitivity.

Figure 16:
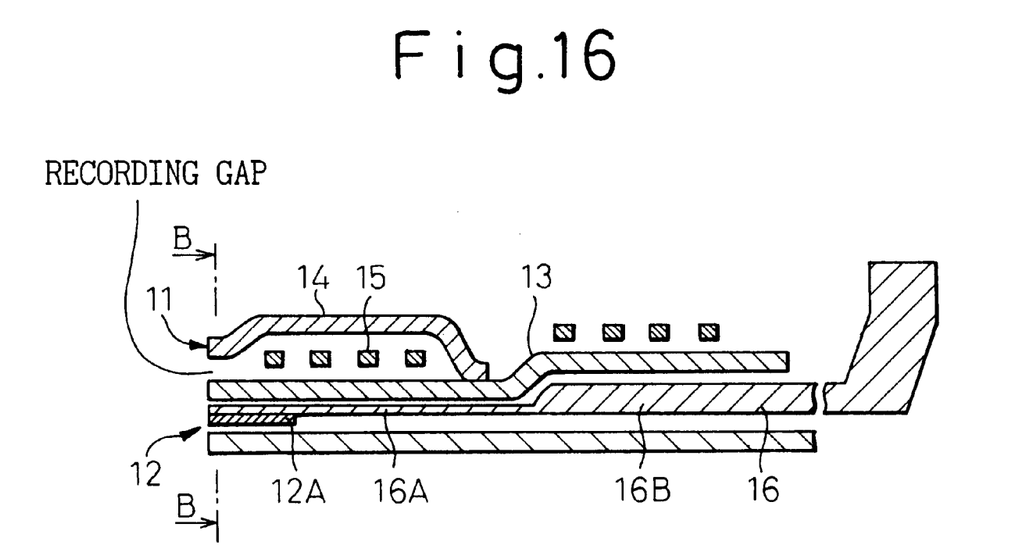
FIG. 16 is a cross-sectional view showing the principle of the magnetoresistive head in the magnetic recording disk device of the present invention.
Figure 17:
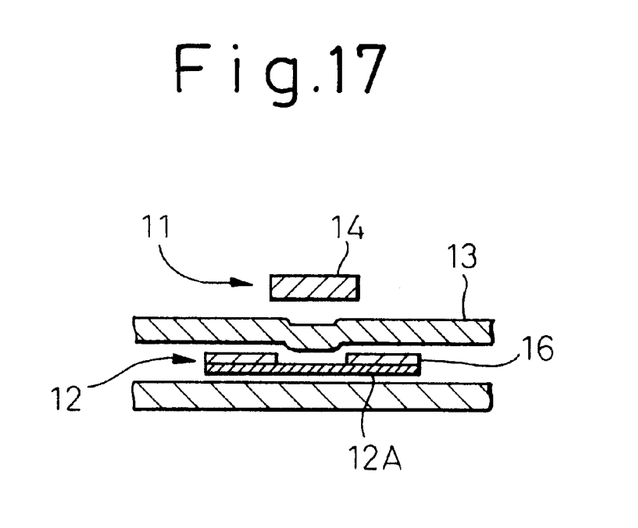
FIG. 17 is a cross-sectional view taken along line B—B of the magnetoresistive head shown in FIG. 16.

In the magnetic disk device of the present invention, preferably, the recording head section and the reproducing head section each may have a laminate structure as shown in FIGS. 16 and 17. FIG. 16 shows a diagram showing the principle of the magnetic disk device of the present invention, and FIG. 17 is a cross-sectional view taken along line B—B of FIG. 16.

In FIGS. 16 and 17, reference numeral 11 designates an induction type recording head section for recording information on a magnetic recording medium, and reference numeral 12 designates a magnetoresistive reproducing head section for reading information. The recording head section 11 comprises: a lower magnetic pole (an upper shield layer) 13 of NiFe or the like; an upper magnetic pole 14 of NiFe or the like, which faces the lower magnetic pole 13 while leaving a certain space; and a coil 15 for exciting the magnetic poles 13 and 14 and permitting information recording on the magnetic recording medium to be conducted in a recording gap section.

The reproducing head section 12 is preferably constituted by an AMR head, a GMR head or the like. On a magnetoresistor section 12A are provided a pair of conductor layers 16, for supplying a sense current into the magnetoresistor 12A, while leaving a space, corresponding to the width of a recording track, between the two conductor layers. In this case, the thickness of the conductor layers 16 is such that thickness of a portion 16A in the vicinity of the magnetoresistor section 12A is small and the thickness of the other portion 16B is large.

In the constructions shown in FIGS. 16 and 17, since the thickness of the conductor layer 16 is small in the portion 16A in the vicinity of the magnetoresistor section 12A, the curving of the lower magnetic pole (upper shield layer) 13 and the like is small. By virtue of this, the recording gap facing the magnetic recording medium is also not significantly deformed. Therefore, even though the position, on a track, of the magnetic head at the time of information recording is somewhat different from the position, on the track, of the magnetic recording at the time of reading of the information, the magnetic disk device can accurately read information, making it possible to avoid a problem that reading errors occur despite a small off-track error.

On the other hand, since the thickness of the conductor layer 16 is large in the portion 16B other than that in the vicinity of the magnetoresistor section 12A, the resistance of the whole conductor layer 16 can be reduced. As a result, a change in resistance of the magnetoresistor section 12A can be detected with a high sensitivity, resulting in improved S/N ratio. Further, generation of heat in the conductor layer 16 can also be avoided, preventing the creation of noise attributable to the generation of heat.

EXAMPLES

The present invention will be described in more detail with reference to typical examples thereof. However, it should be understood that the present invention is not limited to these examples only.

Example 1

Production of the magnetic recording medium (present invention)

Figure 2:
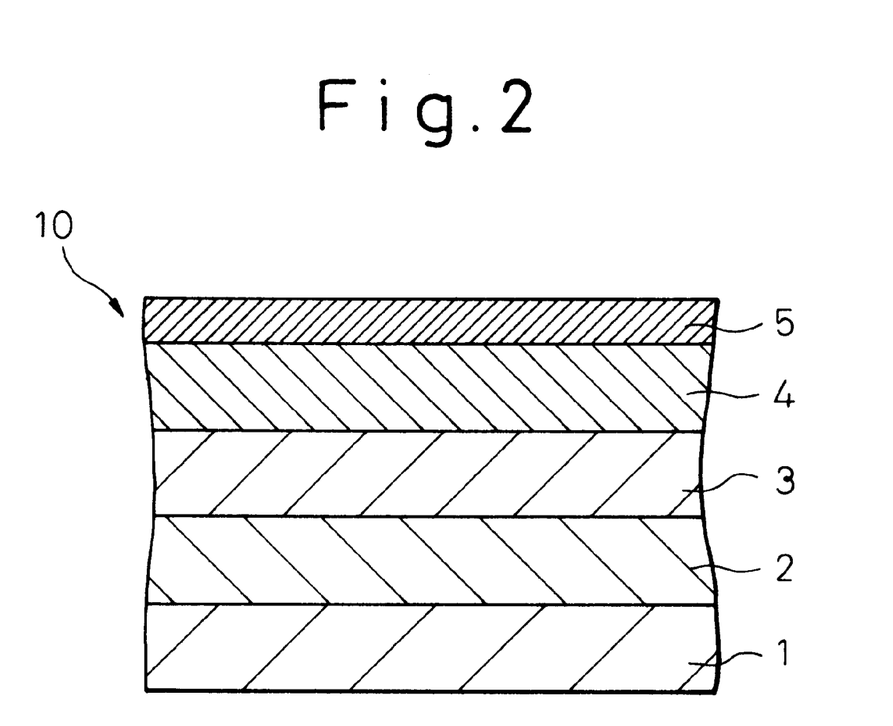
FIG. 2 is a cross-sectional view illustrating one preferred embodiment of the magnetic recording medium according to the present invention.

A magnetic recording medium having the cross-section illustrated in FIG. 2 was produced in this example.

An aluminum (Al) disk substrate 1 was provided, and after it was subjected to a NiP plating process, a surface of the resulting NiP plating layer 2 was well cleaned and then textured to obtain a satisfactorily smooth surface. Using a DC magnetron sputtering system, an underlayer 3 of CrMo 10 (at %), a CoCrPtWC-based magnetic recording layer 4 and a carbon (C) protective layer 5 were deposited in the described order on the NiP-plated aluminum (NiP/Al) disk substrate 1.

To obtain the illustrated layer structure, before formation of the underlayer 3, the sputtering chamber of the system was evacuated to obtain a reduced pressure of not more than $3 \times 10^{-}$Torr, a temperature of the substrate was increased to 280° C., and an argon (Ar) gas was introduced into the sputtering chamber to maintain the chamber at the pressure of 5 mTorr. While applying a bias voltage of −200V, CrMo was sputtered to obtain a CrMo underlayer 3 having a thickness of 10 to 60 nm.

After formation of the CrMo underlayer 3, a CoCrPtWC layer 4 having a tBr of 100 G.$\mu$m (corres. to 27 nm thickness) was deposited on the underlayer 3 in accordance with the sputtering method similar to that used in the formation of the underlayer 3. The composition of the CoCrPtWC layer 4 was varied by using different compositions of a composite target comprising a CoCr target with Pt, W and C chips. Similarly, a C protective layer 5 was sputtered on the CoCrPtWC layer 4. A magnetic recording medium 10 as illustrated in FIG. 2 was thus obtained.

Comparative Example 1

Production of the magnetic recording medium (prior art)

Figure 1:
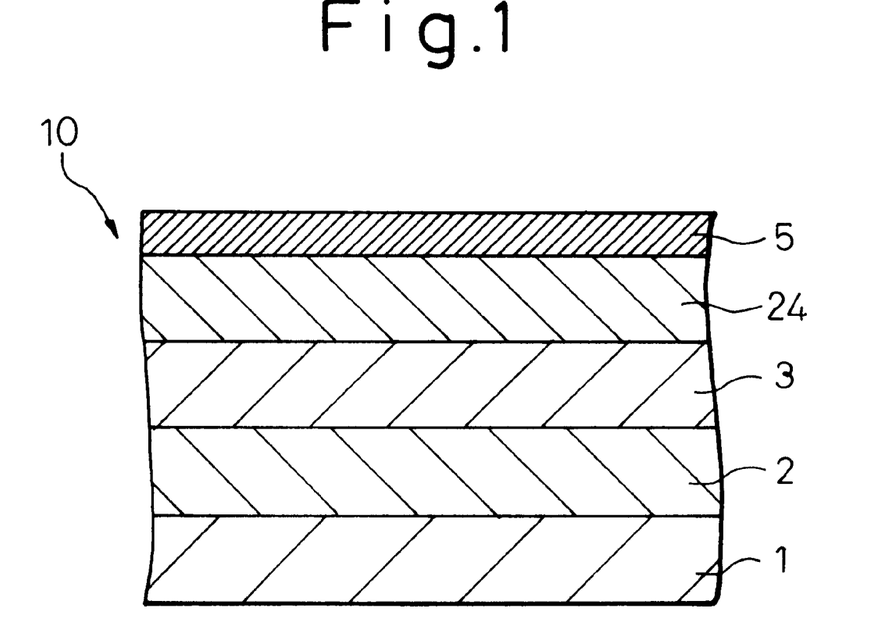
FIG. 1 is a cross-sectional view illustrating one example of the prior art magnetic recording medium.

The procedure of Example 1 was repeated to produce a magnetic recording medium. In this example, however, for comparison purposes, the underlayer was formed from only Cr, and the magnetic recording layer was formed from the three-component alloy, CoCrPt. The resulting prior art magnetic recording medium 10, as is illustrated in FIG. 1, has an Al disk substrate 1 having applied thereon, in sequence, a NiP plating layer 2, a Cr underlayer 3 having a thickness of 25 nm, a $Co_{75}Cr_{13}Pt_{12}$ layer 4 having a thickness of 17 nm and a C protective layer 5.

Example 2

Evaluation of the magnetic recording media

The magnetic recording media produced in Example 1 and Comparative Example 1 were tested to evaluate the below-itemized characteristics (1) to (5). Note that, in the evaluation tests, the analysis of the composition was made by using a EDX system, and magnetic values were determined by using a VSM system.

Figure 4:
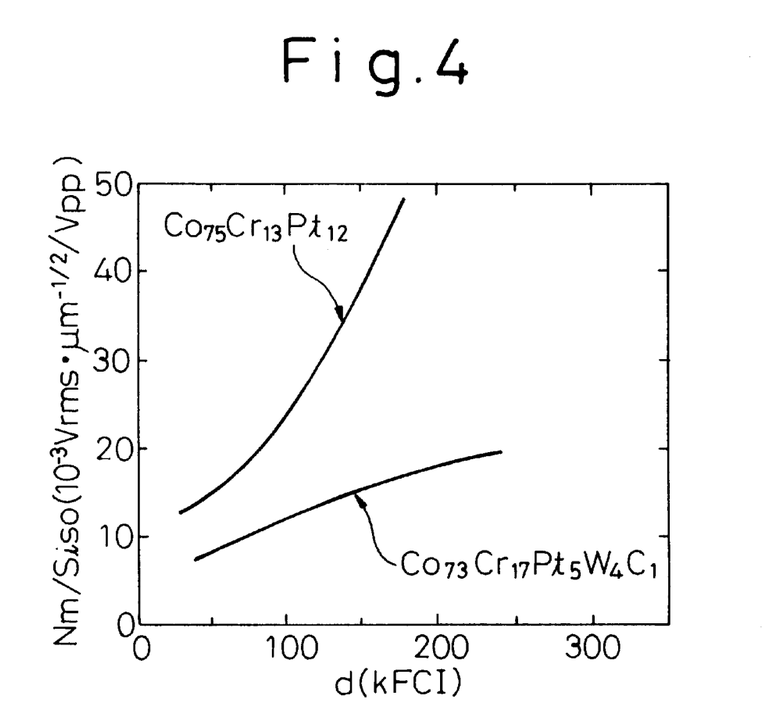
FIG. 4 is a graph showing a dependency of the normalized noise value of the solitary wave in the magnetic recording medium upon the recording density of the medium.

(1) Dependency of the normalized medium noise $Nm/S_{iso}$ upon the recording density The $CO_{73}Cr_{17}Pt_5W_4C_1/Cr_{90}Mo_{10}$ medium showing the present invention (see, FIG. 2) and the $Co_{75}Cr_{13}Pt_{12}/Cr$ medium showing the prior art example (see, FIG. 1) were tested to evaluate a dependency of the normalized medium noise, i.e., $Nm/S_{iso}$ in the magnetic recording medium, upon the recording density of the medium. The results are plotted in FIG. 4. The results indicate that the CoCrPtWC/CrMo medium according to the present invention can effectively inhibit a generation of the noise in the medium in comparison with the prior art CoCrPt/Cr medium.

(2) Dependency of the residual magnetic flux Mr upon the Cr content

Figure 5:
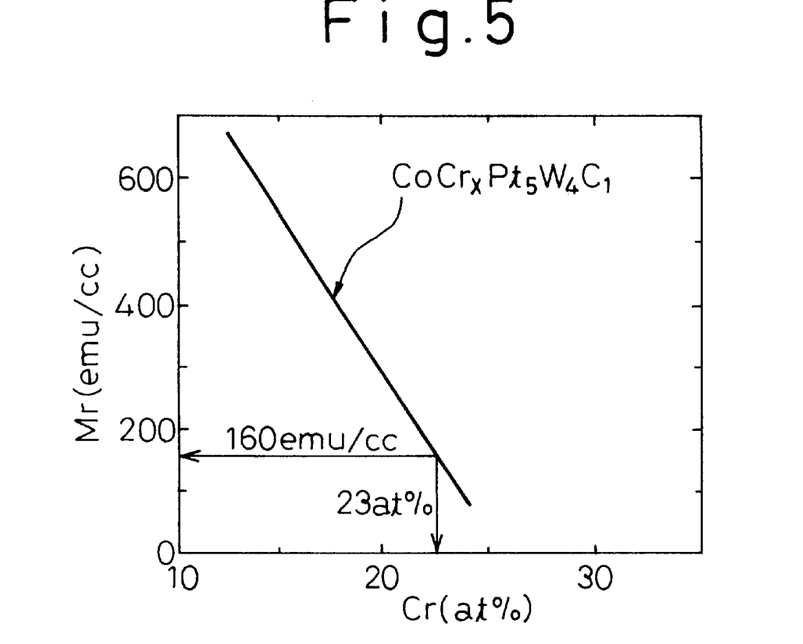
FIG. 5 is a graph showing a dependency of the residual magnetic flux Mr of the magnetic recording medium upon the Cr content of the magnetic layer.

With regard to the $CoCrPtWC/Cr_{90}Mo_{10}$ medium according to the present invention, the magnetic recording layer was constituted so that it has the composition $CoCr_xPt_5W_4C_1$ in which x is variable. A variation of the residual magnetic flux Mr was determined at different Cr contents to obtain a graph showing a dependency of Mr upon the Cr content plotted in FIG. 5. The graph of FIG. 5 indicates that the residual magnetic flux Mr can be linearly reduced with increase of the Cr content, and that the Cr content of 23 at % or less is required to attain and maintain the targeted residual magnetic flux Mr of 160 emu/cc.

Figure 6:
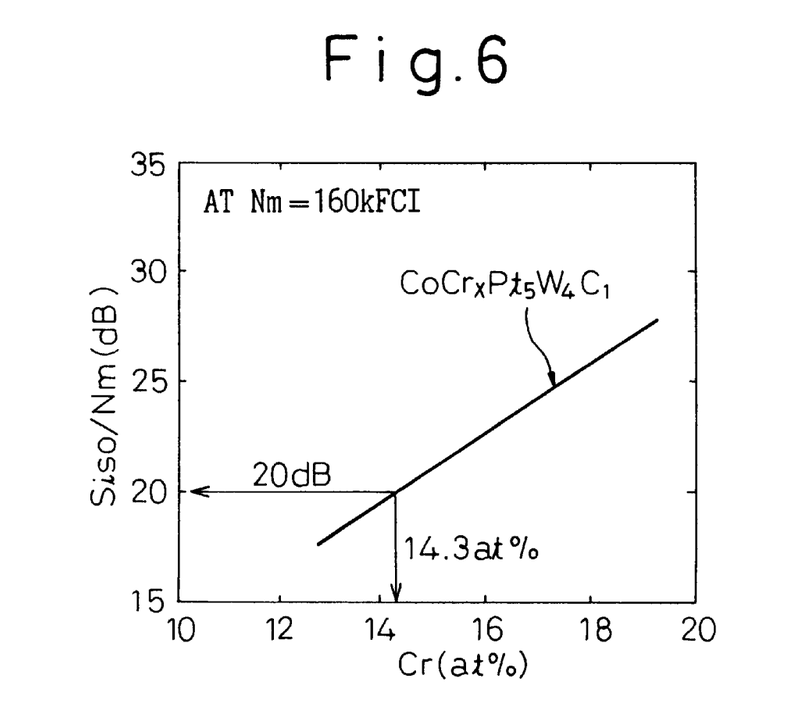
FIG. 6 is a graph showing a dependency of the $S_{iso}/N_m$ ratio in the magnetic recording medium upon the Cr content of the magnetic layer, recording medium according to the present invention.

(3) Dependency of $S_{iso}/Nm$ upon the Cr content With regard to the $CoCrPtWC/Cr_{90}Mo_{10}$ medium according to the present invention, the magnetic recording layer was constituted so that it has the composition $CoCr_xPt_5W_4C_1$ in which x is variable. A variation of $S_{iso}/Nm$ ratio in the medium was determined at different Cr contents to obtain a graph showing a dependency of the medium $S_{iso}/Nm$ ratio upon the Cr content. The graph of FIG. 6 indicates that the medium $S_{iso}/Nm$ ratio can be linearly increased with increase of the Cr content. Also, the graph indicates that the Cr content of at least 14 at % is required to satisfy the requirement of $S_{iso}/Nm$ of 20 dB at the read width of 1 $\mu$m.

(4) Dependency of the coercive force Hc upon the tBr value

Figure 7:
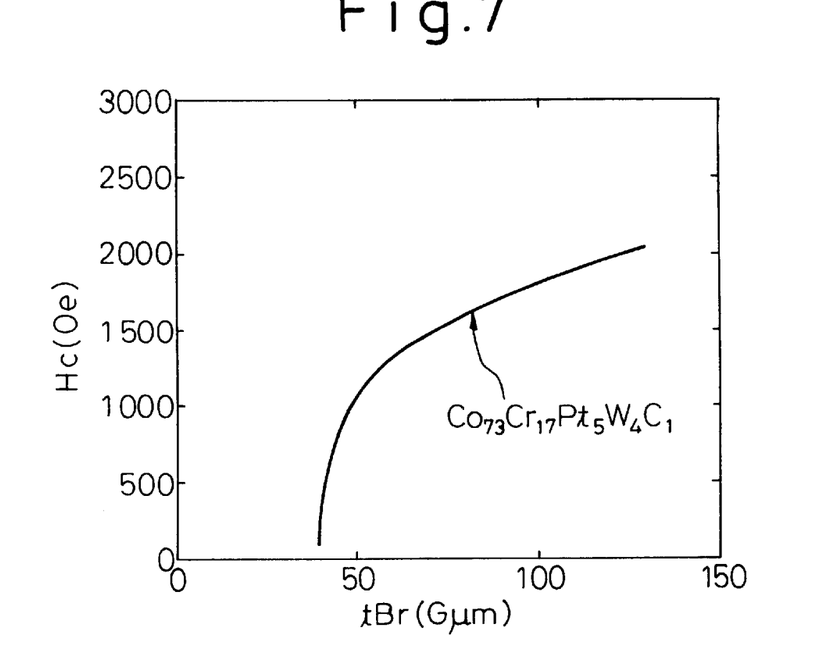
FIG. 7 is a graph showing a dependency of the coercive force Hc of the magnetic recording medium upon the tBr value of the medium.

With regard to the $CO_{73}Cr_{17}Pt_5W_4C_1/Cr_{90}Mo_{10}$ medium according to the present invention, a coercive force Hc was determined at different tBr values to evaluate its dependency upon the tBr value of the medium. The results are plotted in FIG. 7. The results indicate that the coercive force Hc can be suddenly reduced at the tBr of 50 G.$\mu$m or less, that is, the tBr of at least 50 G.$\mu$m is required to obtain and maintain a satisfactorily high coercive force Hc.

(5) Dependency of $S_{160FCI}/Nm$ ratio upon the tBr value

Figure 8:
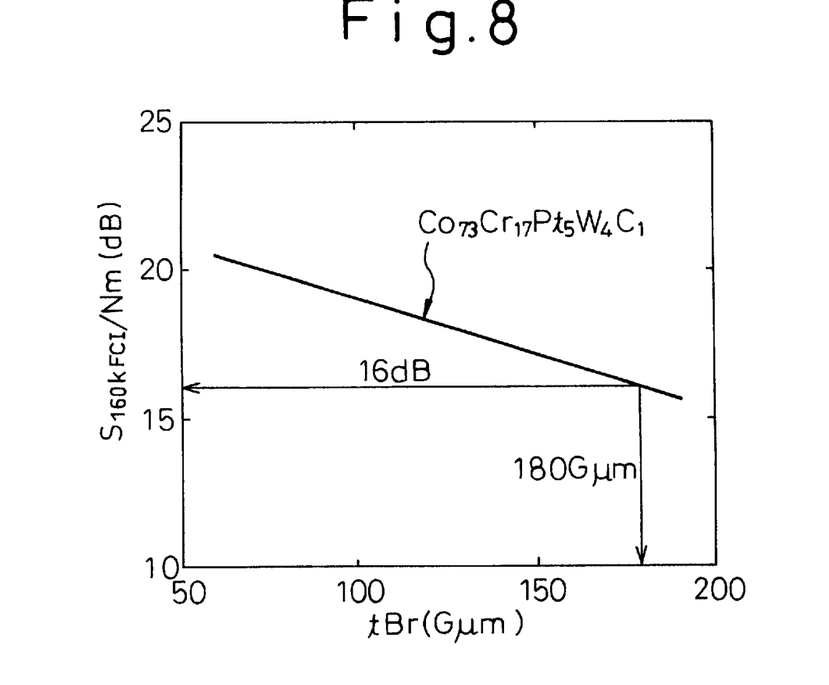
FIG. 8 is a graph showing a dependency of the $S_{160KFCI}/Nm$ ratio of the magnetic recording medium upon the tBr value of the medium.

With regard to the $CO_{73}Cr_{17}Pt_5W_4C_1/Cr_{90}Mo_{10}$ medium according to the present invention, a $S_{160KFCI}/Nm$ ratio of the medium was determined at different tBr values to evaluate its dependency upon the tBr value of the medium. The results are plotted in FIG. 8. The results indicate that the tBr of 180 G.$\mu$m or less is required to obtain a satisfactory S160KFCI/Nm ratio of 16 dB.

Example 3

Production of the magnetic recording medium (present invention)

Figure 3:
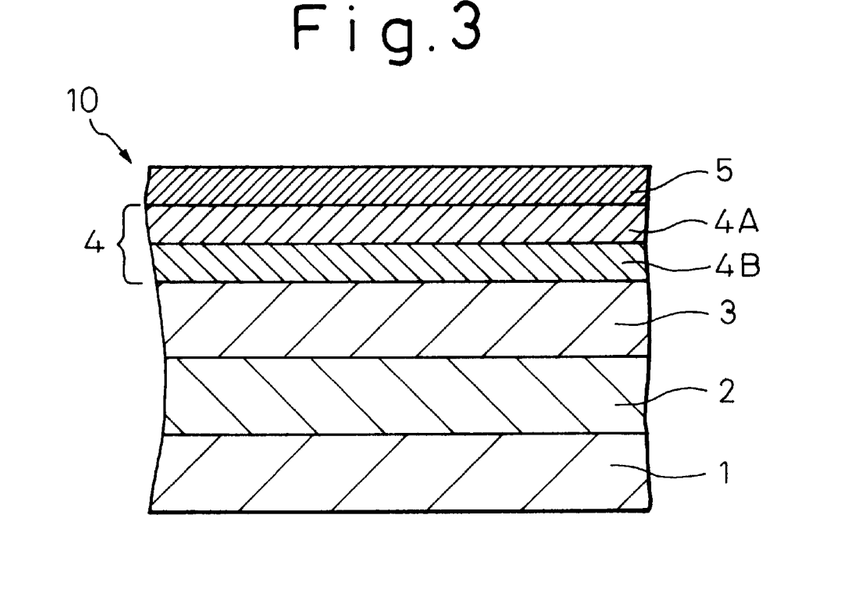
FIG. 3 is a cross-sectional view illustrating another preferred embodiment of the magnetic recording medium according to the present invention.

Three different magnetic recording media including the magnetic recording medium having a cross-section illustrated in FIG. 3 were produced in this example.

An aluminum (Al) disk substrate 1 was provided, and after it was subjected to a NiP plating process, a surface of the resulting NiP plating layer 2 was well cleaned and then textured to obtain a satisfactorily smooth surface. Using a DC magnetron sputtering system, an underlayer 3 of CrMo 10 (at %), a CoCrPt-based magnetic recording layer 4 and a carbon (C) protective layer 5 were deposited in the described order on the NiP-plated aluminum (NiP/Al) disk substrate 1.

To obtain three different media, Nos. 1 to 3, the CoCrPt-based magnetic recording layer 4 was constituted as follows:

Medium No. 1 . . . CoCrPtTaNb layer 4B plus CoCrPtWC layer 4A (illustrated in FIG. 3);

Medium No. 2 . . . only CoCrPtTaNb layer 4B; and

Medium No. 3 . . . only CoCrPtTaNb layer 4A.

To obtain the illustrated layer structure, before formation of the underlayer 3, a sputtering chamber of the system was evacuated to obtain a reduced pressure of not more than $3 \times 10^{-7}$ Torr, a temperature of the substrate was increased to 280° C., and an argon (Ar) gas was introduced into the sputtering chamber maintain the chamber at the pressure of 5 mTorr. While applying a bias voltage of –200V, CrMo was sputtered to obtain a CrMo underlayer 3 having a thickness of 10 to 60 nm.

After formation of the CrMo underlayer 3, a CoCrPt-based magnetic layer 4 was deposited on the underlayer 3 in accordance with the sputtering method similar to that used in the formation of the underlayer 3. For the medium No. 1, the CoCrPtTaNb layer 4B and the CoCrPtWC layer 4A each was sputtered to obtain a tBr of 100 G.μm (corres. to 11 nm thickness). For the medium No. 2, the CoCrPtTaNb layer 4B was sputtered to obtain a tBr of 100 G.μm (corres. to 27 nm thickness). For the medium No. 3, the CoCrPtWC layer 4A was sputtered to obtain a tBr of 100 G.μm (corres. to 25 nm thickness). Similarly, a C protective layer 5 was sputtered on the CoCrPt-based magnetic recording layer 4. The magnetic recording medium 10 (medium No. 1) illustrated in FIG. 3 and two others (mediums No. 2 and No. 3) were thus obtained.

With regard to the three magnetic recording media produced in this example, their typical magnetic characteristics, tBr, Hc, Ms and S are summarized in the following Table 1. For reference, the magnetic characteristics of the prior art magnetic recording medium produced in Comparative Example 1 are also included in the following Table 1.

TABLE 1

| magnetic recording medium | tBr (G. μm) | Hc (Oe) | Ms (emu/cc) | S* |
|---|---|---|---|---|
| (1) $Co_{73}Cr_{17}Pt_5W_4C_1/Co_{74}Cr_{17}Pt_5Ta_2Nb_2$ | 91 | 1861 | 410 | 81 |
| (2) $Co_{74}Cr_{17}Pt_5Ta_2Nb_2$ | 98 | 2845 | 380 | 69 |
| (3) $Co_{73}Cr_{17}Pt_5W_4C_1$ | 116 | 2179 | 440 | 87 |
| (prior art) $Co_{75}Cr_{18}Pt_{12}$ | 130 | 2781 | 710 | 92 |

The results of the above Table 1 indicate that the magnetic recording media according to the present invention can exhibit excellent magnetic characteristics in comparison with the prior art magnetic recording medium.

Example 4
Evaluation of the magnetic recording media

The magnetic recording media produced in Example 3 and Comparative Example 1 were tested to evaluate the below-itemized characteristics (6) to (12). Note in the evaluation tests that the analysis of the composition was made by using a EDX system, and magnetic values were determined by using a VSM system.

(6) Dependency of the SNR upon the recording density

With regard to the three magnetic recording media produced in Example 3, i.e., $Co_{73}Cr_{17}Pt_5W_4C_1/Co_{74}Cr_{17}Pt_5Ta_2Nb_2/Cr_{90}Mo_{10}$ medium (two layered medium; medium No. 1), $Co_{74}Cr_{17}Pt_5Ta_2Nb_2/Cr_{90}Mo_{10}$ medium (single layer medium; medium No. 2) and $Co_{73}Cr_{17}Pt_5W_4C_1/Cr_{90}Mo_{10}$ medium (single layer medium; medium No. 3), a SNR (S/N ratio) of the medium was determined at different recording densities to evaluate its dependency upon the recording medium of the medium. The results are plotted in FIG. 9. The results indicate that for the two layered medium according to the present invention, an improved SNR can be obtained in comparison with the single layer media according to the present invention. They also indicate that a higher SNR can be obtained in a higher recording density area.

Figure 10:
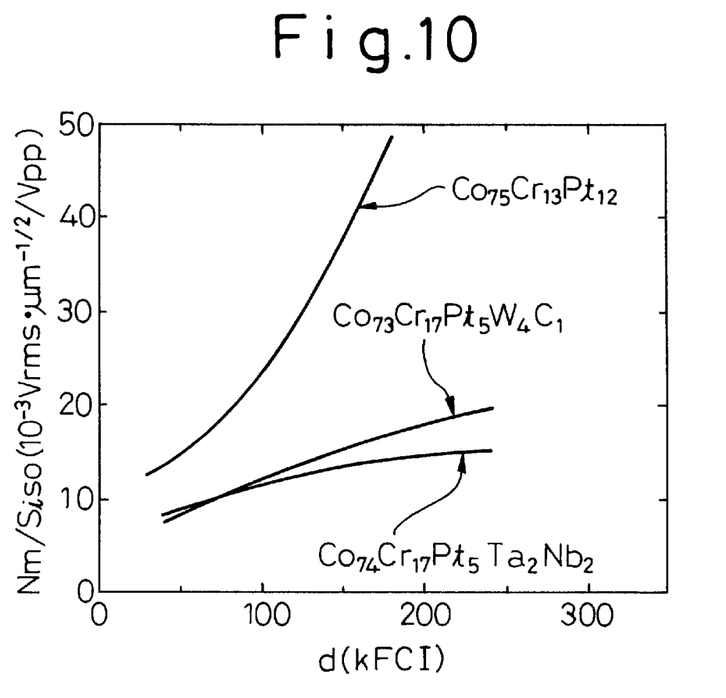
FIG. 10 is a graph showing a dependency of the normalized noise value of the magnetic recording medium upon the recording density of the medium.

(7) Dependency of the normalized medium noise $Nm/S_{iso}$ upon the recording density With regard to the single layer media of the present invention, i.e., $Co_{73}Cr_{17}Pt_5W_4C_1/Cr_{90}Mo_{10}$ medium and $Co_{74}Cr_{17}Pt_5Ta_2Nb_2$ medium, and the prior art single layer medium, i.e., $CO_{75}Cr_{13}Pt_{12}/Cr$ medium, a normalized medium noise $Nm/S_{iso}$ of the medium was determined at different recording densities to evaluate its dependency upon the recording density of the medium. The results are plotted in FIG. 10. The results indicate that, for both the single layer media of the present invention, the noise of the medium can be remarkably reduced in comparison with the prior art single layer medium. This remarkable effect could be obtained because, according to the present invention, a higher Cr content was introduced into the CoCrPt-based alloy and at the same time nonmagnetic materials such as Ta, Nb, W or C were added to the alloy to accelerate a production of nonmagnetic interfacial materials between the magnetic particles, thereby reducing a magnetic interaction between the magnetic particles.

(8) Dependency of the $PW_{50}$ value upon the tBr value

With regard to the three magnetic recording media produced in Example 3, i.e., $Co_{73}Cr_{17}Pt_5W_4C_1/Co_{74}Cr_{17}Pt_5Ta_2Nb_2/Cr_{90}Mo_{10}$ medium (two layered medium; medium No. 1), $Co_{74}Cr_{17}Pt_5Ta_2Nb_2/Cr_{90}Mo_{10}$ medium (single layer medium; medium No. 2) and $Co_{73}Cr_{17}Pt_5W_4C_1/Cr_{90}Mo_{10}$ medium (single layer medium; medium No. 3), a half value width of the reproducing waveform of the isolated wave, i.e., $PW_{50}$, was determined at different tBr values to evaluate its dependency upon the tBr value of the medium. The results are plotted in FIG. 11. The results indicate that the medium No. 3 containing the single $CO_{73}Cr_{17}Pt_5W_4C_1$ layer, if compared with the medium No. 2 containing the single $Co_{74}Cr_{17}Pt_5Ta_2Nb_2$ layer, shows a lower $PW_{50}$ value, thereby enabling an excellent resolution of reproducing output. The results also indicate that for the medium No. 1, containing both of the $CO_{73}Cr_{17}Pt_5W_4C_1$ layer and the $Co_{74}Cr_{17}Pt_5Ta_2Nb_2$ layer, its resolution of reproducing output is worse than that of the medium No. 3, however, it is better than that of the medium No. 2.

Figure 9:
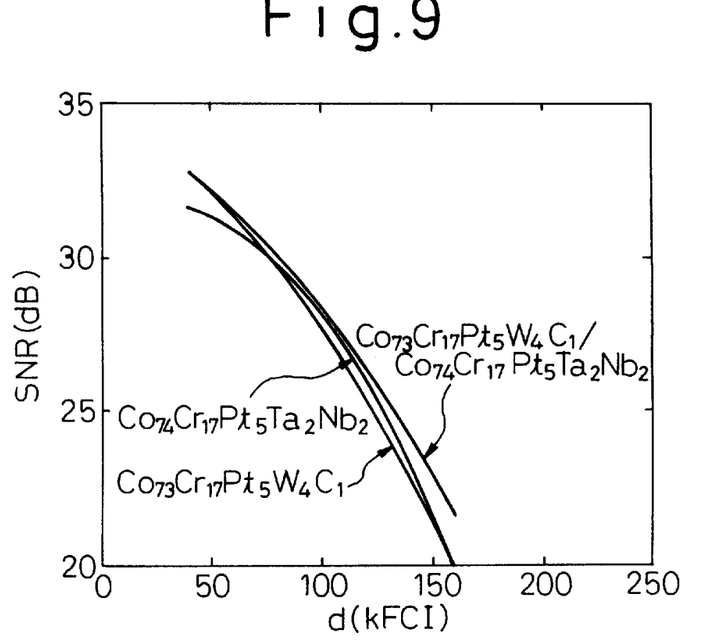
FIG. 9 is a graph showing a dependency of the S/N ratio of the magnetic recording medium upon the recording density of the medium.
Figure 11:
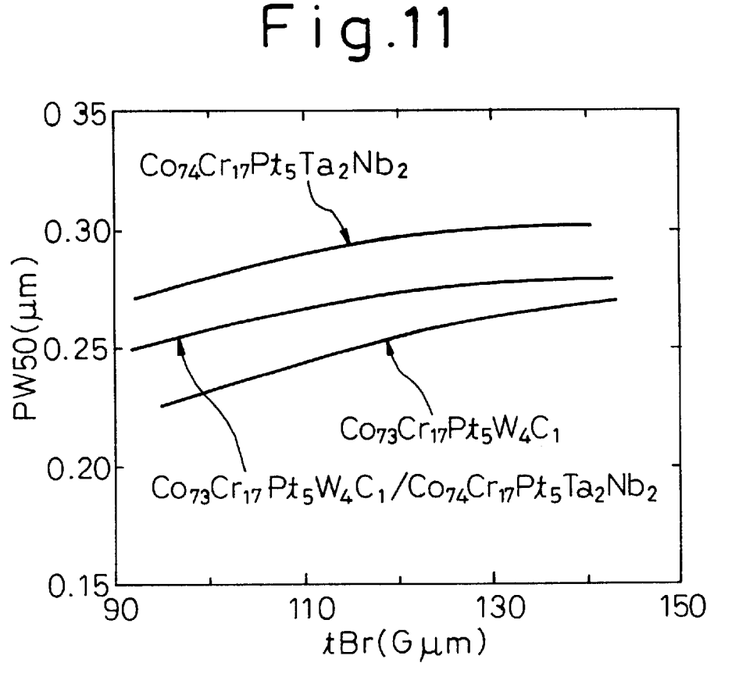
FIG. 11 is a graph showing a dependency of the $PW_{50}$ value of the magnetic recording medium upon the tBr value of the medium.

In addition, the results of FIG. 11 also indicate an improvement in the S/N ratio in the two layered medium, which has been already explained in the above item (6) with reference to FIG. 9. That is, in the two layered medium, the $Co_{74}Cr_{17}Pt_5Ta_2Nb_2$ layer having particularly an excellent low-noise characteristic and the $Co_{73}Cr_{17}Pt_5W_4C_1$ layer having an excellent resolution of reproducing output were laminated to form a magnetic recording layer and the resulting two layered medium can ensure a higher S/N ratio in comparison with the single layer medium containing only a sole magnetic layer.

(9) Dependency of the $S_{iso}/Nm$ ratio upon the Cr content

Figure 12:
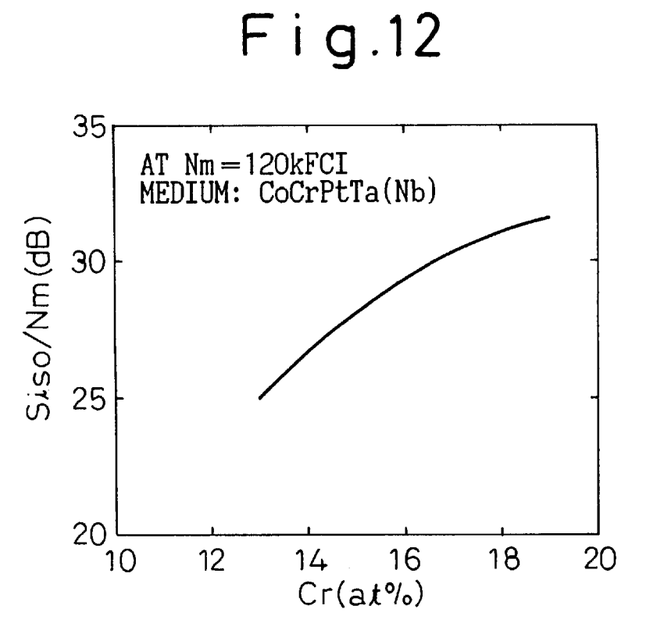
FIG. 12 is a graph showing a dependency of the $S_{iso}/Nm$ ratio in the magnetic recording medium upon the Cr content of the magnetic layer.

With regard to the $CoCrPtTa(Nb)/Cr_{90}Mo_{10}$ medium according to the present invention, a variation in the $S_{iso}/Nm$ ratio in the medium was determined at different Cr contents. The noise value Nm was determined at the recording density of 120 kFCL. The results are plotted in FIG. 12. The graph showing a dependency of the $S_{iso}/Nm$ ratio in the medium upon the Cr content of the CoCrPtTa(Nb) layer indicate that the Cr content of at least 13 at % is required to satisfy the $S_{iso}/Nm$ ratio of 25 dB or more which is considered to be a standard for a medium having a higher S/N ratio.

(10) Dependency of the residual magnetic flux Mr upon the Cr content

Figure 13:
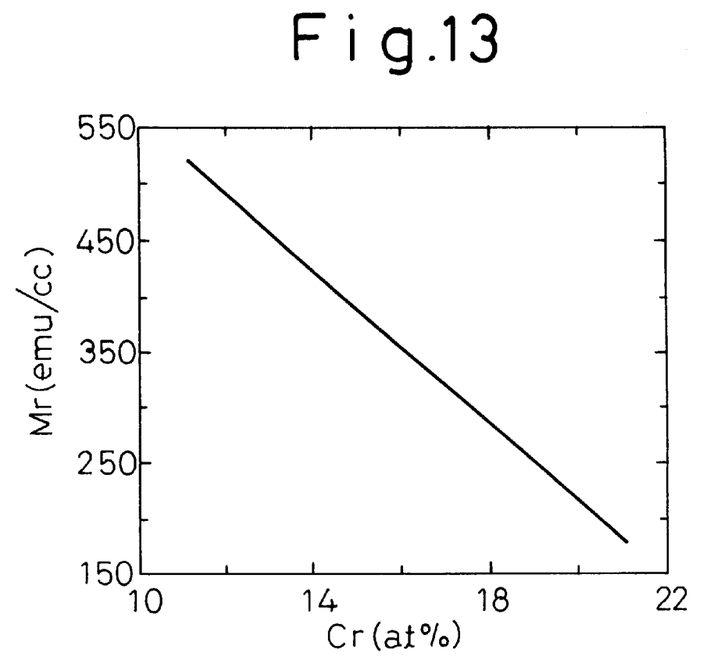
FIG. 13 is a graph showing a dependency of the residual magnetic flux Mr of the magnetic recording medium upon the Cr content of the magnetic layer.

The evaluation test in the above item (9) was further continued to evaluate the dependency of the residual magnetic flux Mr of the medium upon the Cr content of the CoCrPtTa(Nb) layer. The results plotted in FIG. 13 were thus obtained. The results indicate that the Mr value can be linearly reduced with an increase in the Cr content, and a satisfactory Mr value of 160 emu/cc or less can be obtained at the Cr content of around 21 at %. It is appreciated from the results of FIG. 13 that when the Cr content is in the range of about 13 to 21 at %, a satisfactory Mr value can be obtained and retained, along with a high S/N ratio.

(11) Dependency of the coercive force Hc upon the tBr value

Figure 14:
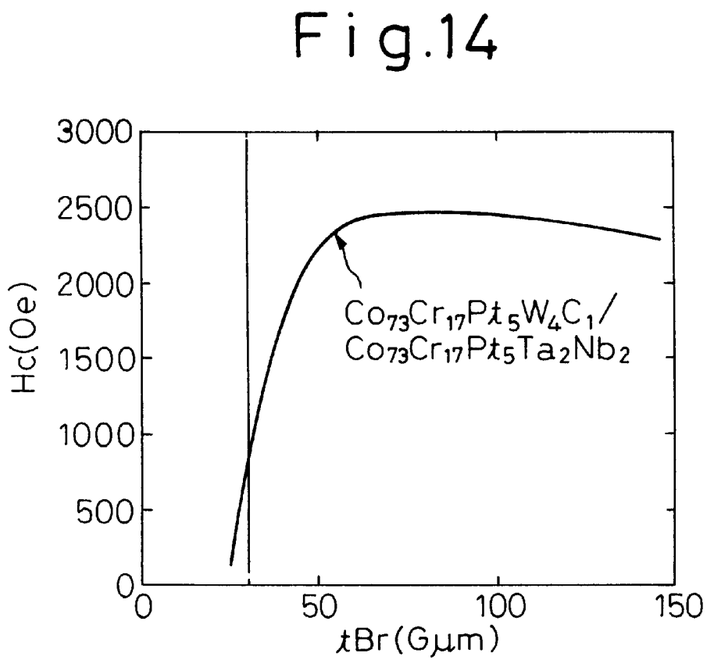
FIG. 14 is a graph showing a dependency of the coercive force Hc of the magnetic recording medium upon the tBr value of the medium.

With regard to the $Co_{73}Cr_{17}Pt_5W_4C_1/Co_{74}Cr_{17}Pt_5Ta_2Nb_2/Cr_{90}M_{10}$ medium (two layered medium; medium No. 1), the coercive force Hc was determined at different tBr values to evaluate its dependency upon the tBr value of the medium. The results plotted in FIG. 14 were obtained. The results indicate that the tBr value of not more than 30 G.μm is insufficient to provide a satisfactory coercive force Hc and, in fact, the resulting Hc value is 1,000 Oe or less, and that a tBr value of at least 30 G.μm is required to obtain and maintain a satisfactory high coercive force Hc.

(12) Dependency of $S_{160KFCI}$/Nm ratio upon the tBr value

Figure 15:
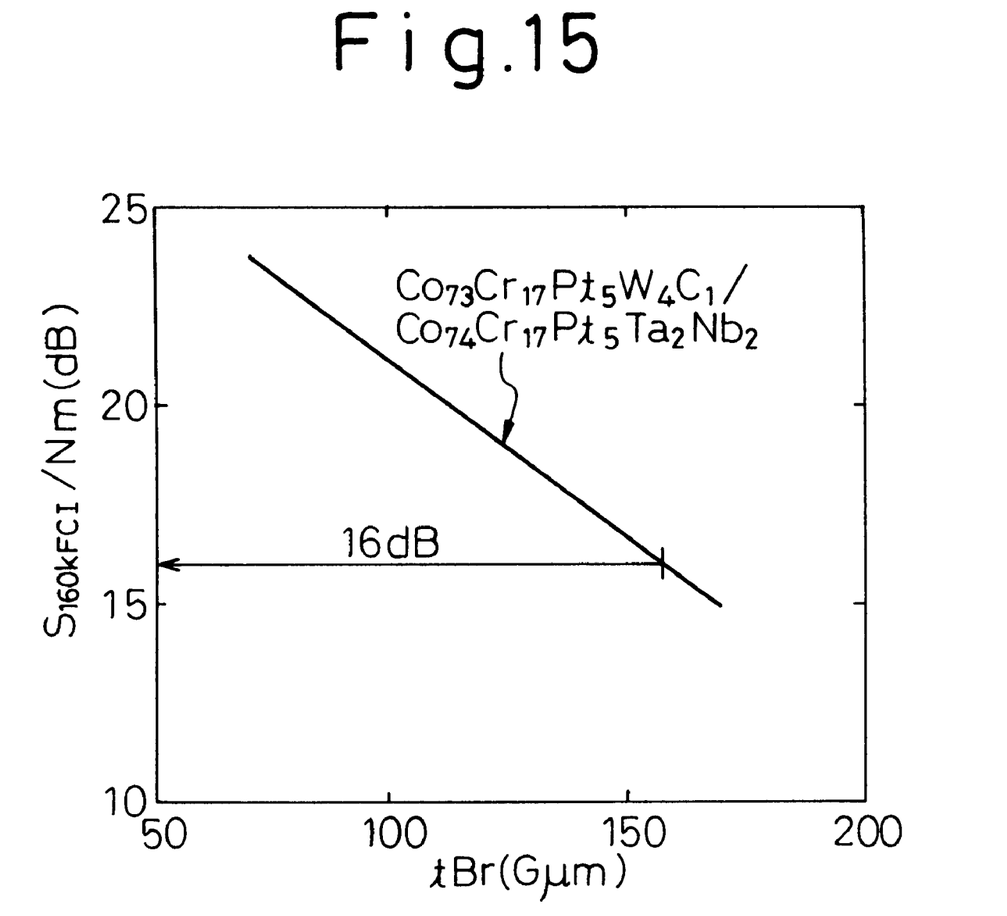
FIG. 15 is a graph showing a dependency of the $S_{160KFCI}/Nm$ ratio of the magnetic recording medium upon the tBr value of the medium.

With regard to the $Co_{73}Cr_{17}Pt_5W_4C_1/Co_{74}Cr_{17}Pt_5Ta_2Nb_2/Cr_{90}M_{10}$ medium (two layered medium; medium No. 1), the $S_{160KFCI}$/Nm ratio of the medium was determined at different tBr values to evaluate its dependency upon the tBr value of the medium. The results plotted in FIG. 15 were obtained. The results indicate that a tBr value of not more than 160 G.μm is required to obtain a satisfactory $S_{160KFCI}$/Nm ratio of 16 dB.

Example 5

Figure 18:
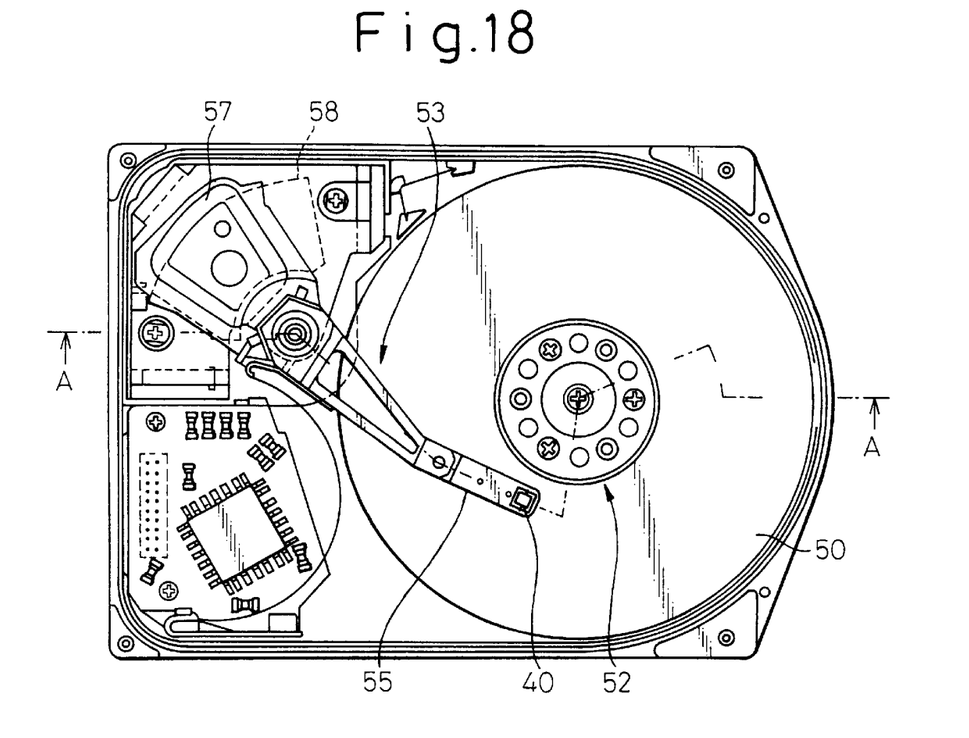
FIG. 18 is a plan view of the magnetic recording disk device according to one preferred embodiment of the present invention.
Figure 19:
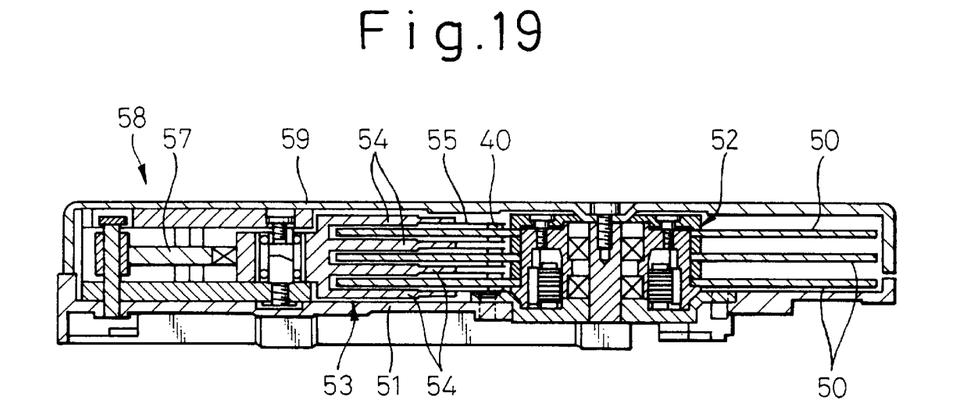
FIG. 19 is a cross-sectional view taken along line A—A of the magnetic recording disk device shown in FIG. 18.

Magnetic disk device using the magnetic recording medium of the present invention The magnetic recording disk device or drive according to one preferred embodiment of the present invention is illustrated in FIGS. 18 and 19, in which FIG. 18 is a plan view of a magnetic disk drive (with a cover removed), and FIG. 19 is a cross-sectional view taken along line A—A of FIG. 18.

In these drawings, reference numeral 50 designates a plurality of magnetic disks (3 disks for the present embodiment) as a magnetic recording medium which is rotated and driven by means of a spindle motor 52 provided on a base plate 51.

Reference numeral 53 designates an actuator rotatably provided on the base plate 51. A plurality of head arms 54, which extend toward the recording face of the magnetic disk 50 are provided on one end of the actuator 53. A spring arm 55 is rotatably mounted on the end of the head arm 54, and, further, a slider 40 is inclinably mounted through an insulating film (not shown) on the flexure section of the spring arm 55. On the other hand, a coil 57 is provided on the other end of the actuator 53.

A magnetic circuit 58 constituted by a magnet and a yoke is provided on the base plate 51, and the coil 57 is disposed within the magnetic gap of the magnetic circuit 58. The magnetic circuit 58 and the coil 57 constitute a moving coil type linear motor (VCM: voice coil motor). The upper surface of the base plate 51 is covered with a cover 59.

The operation of the magnetic disk device having the above construction will be described. When the magnetic disk 50 is in a stopped state, the slider 40 is in contact with a siding zone and in a stopped state.

When the magnetic disk 50 is rotated and driven at high speed by means of a spindle motor 52, an air stream created by the rotation of the magnetic disk 50 permits the slider 40 to fly above the disk face while leaving a very small space between the slider and the disk surface. In this state, the flow of a current through the coil 57 creates thrust in the coil 57, rotating the actuator 53. This permits the head (slider 40) to be moved to a desired track of time magnetic disk 50 to conduct reading/wiring of data.

In this MR head of the disk device, the conductor layer in the head has a small thickness in the vicinity of the magnetoresistor section and the thickness of the other portion is large. This construction reduces the curving of the magnetic pole of the recording head section and, at the same time, lowers the resistance of the conductor layer and, in the case of small off-track error, enables information to be read with high accuracy and high sensitivity.

What is claimed is:

1. A magnetic recording medium comprising a nonmagnetic substrate having applied thereon, through an underlayer of a chromium-based nonmagnetic metal material, at least one magnetic recording layer of a magnetic metal material, in which said magnetic recording layer is constituted from a five-component metal alloy which contains as a principal component thereof cobalt, and also contains 14 to 23% of chromium and 1 to 20% of platinum in combination with tungsten and carbon.

2. The magnetic recording medium according to claim 1, in which said magnetic recording layer has a single layer structure.

3. The magnetic recording medium according to claim 2, in which said five-component metal alloy consisting of cobalt, chromium, platinum, tungsten and carbon is represented by the following formula:

$Co_{bal.}$-$Cr_{14-23}$-$Pt_{1-20}$-$W_x$-$C_y$ in which bal. means a balance amount, and a sum of x and y (x+y) is in the range of 1 to 7 at %.

4. The magnetic recording medium according to claim 3, in which a ratio, of addition amount, of tungsten and carbon in said five component metal alloy consisting of cobalt, chromium, platinum, tungsten and carbon is in the range of 5:1 to 2:1.

5. The magnetic recording medium according to claim 4, in which said ratio, of addition amount, of tungsten and carbon is 4:1 and a sum of x and y in said formula is in the range of 1 to 7 at %.

6. The magnetic recording medium according to claim 2, in which said five-component metal alloy consisting of cobalt, chromium, platinum, tantalum and niobium is represented by the following formula:

$Co_{bal.}$-$Cr_{13-21}$-$Pt_{1-20}$-$Ta_x$-$Nb_y$ in which bal. means a balance amount, and a sum of x and y (x+y) is in the range of 1 to 7 at %.

7. The magnetic recording medium according to claim 6, in which an addition amount of tantalum and that of niobium each is exactly or substantially the same, and a sum of x and y in said formula is in the range of 1 to 7 at %.

8. The magnetic recording medium according to claim 1 or 2, in which said magnetic recording layer has a tBr value (product of a layer thickness t of the magnetic recording layer and its residual magnetic flux density Br) of 30 to 180 G.μm.

9. The magnetic recording medium according to claim 1 or 2, in which said underlayer is constituted from a nonmagnetic metal material mainly consisting of chromium and molybdenum.

10. The magnetic recording medium according to claim 1 or 2, in which said underlayer has a layer thickness of 5 to 60 nm.

11. The magnetic recording medium according to claim 1 or 2, which further comprises a protective layer of carbon or diamond-like carbon.

12. A magnetic recording disk device comprising a recording head section for recording information in a magnetic recording medium and a reproducing head section for reproducing information, wherein the magnetic recording medium is a magnetic recording medium comprising a nonmagnetic substrate having applied thereon, through an underlayer of a chromium-based nonmagnetic metal material, at least one magnetic recording layer of a magnetic metal material, in which said magnetic recording layer is constituted from a five-component metal alloy which contains as a principal component thereof cobalt and also contains 14 to 23 at % of chromium and 1 to 20 at % of platinum in combination with tungsten and carbon, and the reproduction head section is provided with a magnetoresistive head.

13. The magnetic recording disk device according to claim 12, in which the magnetic recording layer of said magnetic recording medium has a single layer structure.

14. The magnetic recording disk device according to claim 12 or 13, in which the magnetoresistive head is an AMR head or a GMR head.

15. The magnetic recording medium according to claim 1, in which said magnetic recording layer has a two layer structure consisting of an upper recording layer and a lower recording layer, wherein said upper recording layer is constituted from a five-component metal alloy which contains as a principal component thereof cobalt and also contains 14 to 23 at % of chromium and 1 to 20 at % of platinum in combination with tungsten and carbon, and said lower recording layer, between said upper recording layer and said underlayer, is constituted from a five-component metal alloy which contains as a principal component thereof cobalt and also contains 13 to 21 at % of chromium and 1 to 20 at % of platinum in combination with tantalum and niobium.

16. The magnetic recording medium according to claim 15, in which said five-component metal alloy consisting of cobalt, chromium, platinum, tungsten and carbon of said upper recording layer is represented by the following formula:

$$Co_{bal.}\text{-}Cr_{14\text{-}23}\text{-}Pt_{1\text{-}20}\text{-}W_x\text{-}C_y$$

in which bal. means a balance amount, and a sum of x and y (x+y) is in the range of 1 to 7 at %.

17. The magnetic recording medium according to claim 16, in which a ratio, of addition amount, of tungsten and carbon in said five component metal alloy consisting of cobalt, chromium, platinum, tungsten and carbon is in the range of 5:1 to 2:1.

18. The magnetic recording medium according to claim 17, in which said ratio, of addition amount, of tungsten and carbon is 4:1 and a sum of x and y in said formula is in the range of 1 to 7 at %.

19. The magnetic recording medium according to claim 15, in which said five-component metal alloy consisting of cobalt, chromium, platinum, tantalum and niobium of said lower recording layer is represented by the following formula:

$$Co_{bal.}\text{-}Cr_{13\text{-}21}\text{-}Pt_{1\text{-}20}\text{-}Ta_x\text{-}Nb_y$$

in which bal. means a balance amount, and a sum of x and y (x+y) is in the range of 1 to 7 at %.

20. The magnetic recording medium according to claim 19, in which an addition amount of tantalum and that of niobium each is exactly or substantially the same, and a sum of x and y in said formula is in the range of 1 to 7 at %.

21. The magnetic recording medium according to claim 1 or 15, in which said magnetic recording layer has a tBr value (product of a layer thickness t of the magnetic recording layer and its residual magnetic flux density Br) of 30 to 180 G.μm.

22. The magnetic recording medium according to claim 1 or 15, in which said underlayer is constituted from a nonmagnetic metal material mainly consisting of chromium and molybdenum.

23. The magnetic recording medium according to claim 1 or 2, in which said underlayer has a layer thickness of 5 to 60 nm.

24. The magnetic recording medium according to claim 1 or 2, which further comprises a protective layer of carbon or diamond-like carbon.

25. The magnetic recording disk device according to claim 12, in which the magnetic recording layer of said magnetic recording medium has a two layer structure consisting of an upper recording layer and a lower recording layer, wherein said upper recording layer is constituted from a five-component metal alloy which contains as a principal component thereof cobalt and also contains 14 to 23 at % of chromium and 1 to 20 at % of platinum in combination with tungsten and carbon, and said lower recording layer, between said upper recording layer and said underlayer, is constituted from a five-component metal alloy which contains as a principal component thereof cobalt and also contains 13 to 21 at % of chromium and 1 to 20 at % of platinum in combination with tantalum and niobium.

26. The magnetic recording disk device according to claim 12 or 25, in which the magnetoresistive head is one of an AMR head and a GMR head.

* * * * *